Aug. 23, 1960
H. A. SCHRENK
2,949,934
APPARATUS FOR PROMOTING NON-CHANNELING FLOW OF LIQUID THROUGH TREATMENT AND/OR REACTION ZONES
Filed March 9, 1956
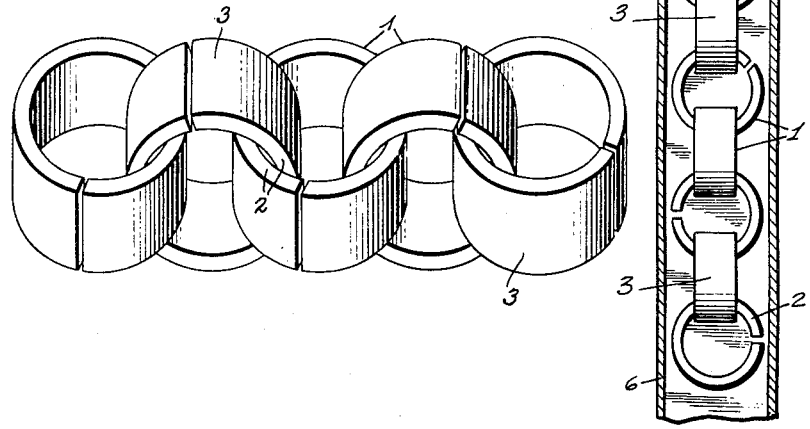
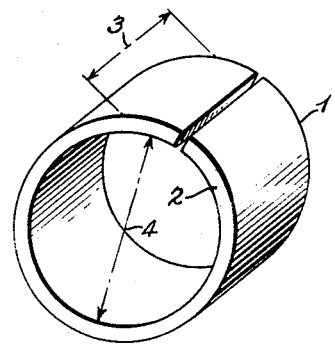
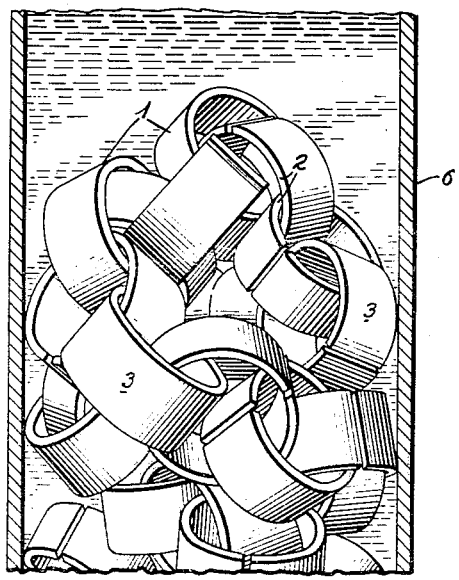
INVENTOR
*Hans Alwin Schrenk*
BY *Stevens, Davis, Miller & Mosher*
ATTORNEYS

2,949,934

United States Patent Office
Patented Aug. 23, 1960

2,949,934

APPARATUS FOR PROMOTING NON-CHANNELING FLOW OF LIQUID THROUGH TREATMENT AND/OR REACTION ZONES

Hans Alwin Schrenk, Arnhem, Netherlands, assignor to N.V. Onderzoekingsinstitute Research, Arnhem, Netherlands, a corporation of the Netherlands Filed Mar. 9, 1956, Ser. No. 570,638

Claims priority, application Netherlands Mar. 21, 1955

2 Claims. (Cl. 138—38)

This invention relates to method and apparatus for bringing about a more nearly uniform flow, corresponding to what may be termed a non-channeling flow, of liquids passing through zones or regions where they are subjected to one or more physical or chemical actions or reactions or combinations thereof.

It is already known that as the velocity of flow and/or the viscosity of a liquid is lower or higher, respectively, in certain cases the condition of flow of such a liquid while flowing through vessels or through pipes shows a more laminar character. This laminar type of flow often causes difficulties in industrial processing if for some reason or other it is desired to bring about a mixing of the liquid on flowing.

Such a mixing of a liquid on flowing is generally necessary if during its movement certain changes in the liquid occur. With laminar flow, undesirable differences in properties can occur in the various layers of the moving liquid so that e.g. the liquid near the wall of the flow vessel differs considerably in properties from the liquid in the middle of the vessel. This non-uniformity of properties throughout the moving liquid frequently cannot be tolerated.

In the viscose rayon industry such a problem often arises in the case of flow through long, sometimes vertically mounted, tubes in which in view of heat exchange problems differences in temperature and ripeness in the various flow layers of the viscose flowing through the tubes tend to come about, if such tendencies are not counteracted.

A corresponding difficulty is also frequently present in the carrying out of polymerization reactions for obtaining highly polymerized substances, such as polyamides, polyesters, polyurethanes and the like, in cases where the reaction mass is to be transported through tubular elements or the like for some reason or other. The laminar flow occurring in the reaction mass gives rise to undesired differences in structure of the polymerization product present in the various layers.

Means are already known whereby the laminar flow may be changed to a intermingling non-turbulent flow having the properties of a non-channeling flow and, moreover, providing a mixing throughout the flowing mass across the direction of total flow thereof. Generally there is used for this purpose a filling material that takes up in and of itself a comparatively restricted volume, e.g. Raschig rings of which the height equals the diameter, or saddle-shaped elements. Usually filling elements are used which by their nature of construction assume a completely arbitrary (i.e., random) distribution upon filling the flow vessel with said elements and which thereby cause a completely intermingling flow (non-channeling flow) of the liquid passing through the vessel. However, the use of Raschig rings and the like filling elements gives rise under certain conditions to serious difficulties. As soon as it becomes necessary for some reason or other to clean the filling elements, and especially when (as is frequently the case) periodic cleanings are necessary, great difficulties present themselves on removing the filling elements from the flow vessel. This is especially true where the flow vessels are long and tubular and are not easily taken apart, in which case the use of the conventional Raschig rings as filling material is practically impossible as a practical matter.

According to the present invention a filling material has now been discovered that overcomes all the objections mentioned above and which at the same time readily affords a liquid flow corresponding to the desired non-channeling flow.

In accordance with the invention a filler material is provided which consists of a band ring chain of which each link is a thin-walled cylinder.

After a flow vessel has been filled therewith, such a chain may be conveniently and easily removed from the vessel by pulling at one end of the chain, so that the objections to previously known filling material when cleaning, and especially periodic cleaning, becomes necessary are no longer present, as a practical matter.

The manner in which the foregoing features of the invention are attained will appear more fully from the following detailed description thereof, in which reference is made to typical and preferred procedures and to the accompanying drawing illustrating one preferred embodiment merely in order to indicate more fully the nature of the invention but without intending to limit the invention thereby.

In the accompanying drawing, Fig. 1 shows in perspective view a portion (five links) of a band ring chain according to the present invention; Fig. 2 shows one link on a somewhat enlarged scale; Fig. 3 shows a band ring chain disposed in a vertically mounted flow vessel as described hereinafter in Example II and elsewhere; while Fig. 4 shows a band ring chain disposed in stretched condition in a flow vessel as described hereinafter in Example I and elsewhere.

In Fig. 2, 1 indicates the band material from which the link is manufactured, 2 its wall thickness, 3 its width, and 4 the internal diameter of the link. The width 3 determines therefore the height of the link.

In case any chain whatsoever were to be used indiscriminately as filling material, the remaining liquid flow passages in the vessel would be either too small or too large or not sufficiently uniformly distributed as a result of which the flow would deviate from a satisfactory non-channeling flow. It was therefore surprising that by using a band ring chain according to the present invention a flow is obtained reasonably corresponding to a non-channeling flow.

For a complete filling of the flow vessels it is desirable that the band ring chain should be disposed in the vessel in an arbitrary and flexible or random manner. This is attained when the links are so loose relative to each other that with a chain consisting of five links as shown in Fig. 1, the first and the last link may be brought without difficulty against each other with the outer walls touching. This requirement is met when the height 3 of the thin-walled cylinder is so chosen with regard to the diameter 4 and the wall thickness 2 that into each of said links at least two links with said height and one with half that heaght may be fitted, and at most four links with said height.

With inordinately high cylinders the first and the fifth links cannot be brought against each other and there remains a certain rigidity. Links with a small height always satisfy the minimum requirement according to the invention; however, in actual practice it has been established that the most satisfactory flow results are obtained (i.e., a flow which compares completely with the flow obtained with Raschig rings) if the dimensions are chosen such that, at most, four links of the height selected may fit into one link of said height.

It is also desirable that the wall thickness 2 be less than 1/12 of the link diameter 4. This ratio is in connection with the mobility of the chain, but it is also very satisfactory in connection with the flow resistance thereof.

For all flow vessels, and especially for tubular flow vessels, the chains according to the present invention may be used for obtaining a flow resembling a non-channeling flow provided the smallest diameter of the vessel is at least twice the diameter of one of the links.

With tubes in which the band ring chain approximately fits in a stretched condition, and therefore generally in narrow tubes, it has been discovered, surprisingly, that when using a band ring chain according to the present invention a satisfactory non-channeling flow can easily be obtained—and this in a somewhat different manner—by not laying down the chain loosely into the tube, but on the contrary by placing the chain in a more or less stretched condition in the tube and by maintaining it in that condition. It was found that the best results are obtained if the height 3 of the thin-walled cylinder is so chosen that into each of the links, two other links with that same height plus at most one other link with half that height may be fitted. In this manner a non-channeling flow may be realized in a very satisfactory and easy manner in long pipe lines having a diameter of 5 cm. and less, the diameter of the ring preferably being so chosen that the chain fits with only small play in the pipe.

Although the ratio between the height 3 and the diameter 4 should be maintained within certain limits according to the most preferred embodiment of the present invention, nevertheless the absolute dimensions of the rings forming the chain may be adapted to the space to be filled without deviating from the principle of the invention. When filling tubes having internal diameters between 5 and 25 cm., in general rings will not be given a diameter larger than 10–15 mm. In very large vessels ring diameters of several centimeters may be employed.

In narrower tubes chains are preferably used which in stretched condition approximately fit into the tubes as hereabove already indicated. With a tube having an internal diameter of 2.5 cm. a chain is used of which the links have an internal diameter of 17 mm., and with a tube having an internal diameter of e.g. 12 mm. links are used having an internal diameter of 8 mm.

Generally it is preferred that the total volume of the chain shall be not more than 12% of the volume of the vessel in which it is disposed.

The material of construction from which the band ring chains of the present invention are manufactured should be sufficiently strong, under the given conditions encountered in actual use, so as to enable one of the links to support the weight of the entire chain. The material should also be one that is not attacked by the liquid flowing through the vessel in contact with the chain. In some cases therefore chains from synthetic substances may be used; however, in many cases, especially with high temperatures and alkaline liquids, such as viscose, it is preferred to manufacture the chains from stainless steel.

The following examples illustrate in detail specific embodiments of the invention.

*Example I*

In a viscose supply pipe line having a length of 25 m. and a diameter of 25 mm., and with viscose supplied at the rate of 60 litres per hour to a spinning machine having 100 spinning points directly connected to the pipe line, appreciable differences occured in the dyeing affinity properties and in the mechanical properties of the threads spun from said spinning points dependent upon the location of the spinning points on said supply line.

Into the supply line only one stainless steel straight band ring chain was placed, the links thereof having the following dimensions:

|  | Mm. |
|---|---|
| Height of the cylinder (3 in Fig. 2) | 12 |
| Internal diameter (4 in Fig. 2) | 17 |
| Wall thickness (2 in Fig. 2) | 1 |

After putting the band ring chain into the viscose line, there could no longer be observed any difference in the threads produced at the various spinning points.

*Example II*

In an apparatus for de-aerating viscose by heating the viscose in a vertical tube portion (6 in Fig. 3) by means of a warm water jacket (not shown) surrounding said tube portion, a thoroughly reliable operation was attained by filling the tube with a band ring chain as shown in Fig. 3. The vertical heating tube had a length of 1.5 m. and an internal diameter of 60 mm. The tube was completely filled with a stainless steel band ring chain of which the links had the following dimensions:

|  | Mm. |
|---|---|
| Height of the cylinder | 9 |
| Internal diameter | 16 |
| Wall thickness | 0.8 |

*Example III*

On polymerizing, ε-caprolactam according to the well-known continuous method, in which method the polymerization mixture flows through a vertical tubular column and the polymerisate is drawn off at the bottom, the tubular column having a total length of 6 m. and an internal diameter of 50 cm. was filled to a height of 3.5 m. from the bottom with a band ring chain of which the links were as follows:

|  | Mm. |
|---|---|
| Height of the cylinder | 25 |
| Internal diameter | 45 |
| Wall thickness | 1.5 |

A much more uniform polymerization product was obtained than when operating in otherwise the same manner but without the band ring chain.

In each of the three instances given above, it was a simple matter to remove the band ring chain from the vessel for cleaning purposes.

While the band ring chain in each of the above examples was made of stainless steel, other materials of construction may be used. For example, band ring chains made of "Saran" or glass may be successfully used where the chemical and physical properties of these materials are favorable and where the use of metal chains is not desirable.

While specific examples of preferred methods and apparatus embodying the present invention have been set forth above, it will be understood that many changes and modifications may be made in the methods of procedure and in the apparatus shown without departing from the spirit of the invention. It will therefore be understood that the examples cited and the particular methods and apparatus set forth above are intended to be illustrative only, and are not intended to limit the scope of the invention.

What is claimed is:

1. A flow vessel provided with means for obtaining a non-channeling flow of liquids therethrough, said means comprising a band ring chain of interlinked rings disposed in extended condition in said flow vessel, each ring of the band ring chain consisting of a relatively thin-walled cylinder (a) whose outer diameter is slightly less than the inner diameter of the flow vessel so that the band ring chain fits in the flow vessel with only small play and (b) whose height with respect to its diameter and wall thickness is such that into each of said rings besides two rings with that height only one ring with half that height may be fitted.

2. A flow vessel as defined in claim 1, wherein the relatively thin-walled cylinders forming the rings have a wall thickness which is less than $1/12$ of the internal diameter of said cylinder.

References Cited in the file of this patent

UNITED STATES PATENTS

| | | |
|---|---|---|
| 719,921 | Webster | Feb. 3, 1903 |
| 1,074,632 | Lashar | Oct. 7, 1913 |
| 1,088,357 | Morse | Feb. 24, 1914 |
| 2,376,349 | Frischer | May 22, 1945 |
| 2,549,335 | Rahthus | Apr. 17, 1951 |

FOREIGN PATENTS

| | | |
|---|---|---|
| 104,163 | Great Britain | Oct. 11, 1917 |